(12) United States Patent
Li

(10) Patent No.: US 12,714,090 B2
(45) Date of Patent: Aug. 25, 2026

(54) DETACHABLE OUTDOOR MOSQUITO REPELLENT DEVICE

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/203,654

(22) Filed: May 9, 2025

(65) Prior Publication Data

US 2026/0240144 A1 Aug. 20, 2026

(30) Foreign Application Priority Data

Feb. 20, 2025 (CN) ........................ 202510189517.8

(51) Int. Cl.
*A01M 29/12* (2011.01)
*A01M 29/18* (2011.01)

(52) U.S. Cl.
CPC ........... *A01M 29/12* (2013.01); *A01M 29/18* (2013.01); *A01M 2200/012* (2013.01)

(58) Field of Classification Search
CPC ................. A01M 29/12; A01M 29/28; A01M 2200/012; H01M 2/1022; H01M 2220/30
See application file for complete search history.

(56) References Cited

U.S. PATENT DOCUMENTS 5,700,430 A * 12/1997 Bonnema ........... A01M 1/2088 422/4
5,928,605 A * 7/1999 Bonnema ............... F23D 14/28 422/5
7,167,641 B2 * 1/2007 Tam ........................ A61L 9/127 392/405
10,271,538 B2 * 4/2019 Shapiro ................. A01M 29/14
10,357,033 B2 * 7/2019 Marchetti ........... A01M 1/2061
D880,645 S * 4/2020 Gu .............................. D22/119
10,638,743 B1 * 5/2020 Shapiro ................. H01M 10/48
10,952,427 B2 * 3/2021 Kwon ................. H04M 1/0202
D995,708 S * 8/2023 Fan ............................. D22/122
2010/0053935 A1 3/2010 Shen
2010/0224697 A1 * 9/2010 Modlin ............... B05B 17/0684 43/132.1

(Continued)

FOREIGN PATENT DOCUMENTS

CN 108935437 A * 12/2018 ........... A01M 29/28
CN 208690948 U 4/2019

(Continued)

*Primary Examiner* — Monica L Perry
*Assistant Examiner* — Aaron M Rodziwicz
(74) *Attorney, Agent, or Firm* — Maier & Maier, PLLC

(57) ABSTRACT

A detachable outdoor mosquito repellent device is provided, relating to the field of mosquito repellent. The detachable outdoor mosquito repellent device includes: a mosquito repellent main body, a mosquito repellent tail portion is provided, the mosquito repellent tail portion is provided with a power input port and a locking clasp; a power supply unit, a power supply head portion is provided, the power supply head portion is provided with a locking opening and a power output port; the locking clasp is detachably engaged with the locking opening, and the power input port is configured to engage with the power output port; when the locking clasp engages with the locking opening, the power output port is connected to the power input port, and the power supply unit supplies power to the mosquito repellent main body through the power output port.

8 Claims, 6 Drawing Sheets

(56) References Cited

U.S. PATENT DOCUMENTS

| | | | | |
|---|---|---|---|---|
| 2011/0038761 | A1* | 2/2011 | Saleh | A61L 9/122 422/124 |
| 2011/0057051 | A1* | 3/2011 | Wang | A01M 1/2088 239/34 |
| 2011/0296735 | A1* | 12/2011 | Richter | A01K 79/02 43/1 |
| 2015/0027383 | A1* | 1/2015 | Richter | A01M 29/28 119/712 |
| 2015/0128877 | A1* | 5/2015 | McIntyre | A01M 29/12 119/712 |
| 2015/0352241 | A1* | 12/2015 | Furner | A01M 1/2033 422/105 |
| 2016/0255828 | A1* | 9/2016 | Cestino | G01S 19/42 |
| 2018/0027797 | A1* | 2/2018 | Wang | A01M 29/12 |
| 2018/0360020 | A1* | 12/2018 | Burch | A01N 61/00 |
| 2019/0008137 | A1* | 1/2019 | Shapiro | A01M 29/12 |
| 2021/0235684 | A1* | 8/2021 | Wang | A01M 29/12 |
| 2023/0084442 | A1* | 3/2023 | Li | A01M 29/12 239/409 |
| 2023/0285993 | A1* | 9/2023 | Shapiro | B05B 1/28 |
| 2024/0180139 | A1* | 6/2024 | Hainze | A01N 25/02 |
| 2024/0298630 | A1 | 9/2024 | Li | |

FOREIGN PATENT DOCUMENTS

| | | | | | |
|---|---|---|---|---|---|
| CN | 113973802 | A | * | 1/2022 | A44C 15/0085 |
| CN | 215684389 | U | * | 2/2022 | |
| CN | 115843764 | A | | 3/2023 | |
| DE | 202013004544 | U1 | * | 6/2013 | A01M 29/10 |
| FR | 2817120 | A1 | * | 5/2002 | H04M 1/18 |
| KR | 20010025175 | A | * | 4/2001 | A01M 29/18 |
| KR | 200302988 | Y1 | * | 2/2003 | F04D 25/08 |
| KR | 200424364 | Y1 | * | 8/2006 | A47C 210/48 |
| KR | 20100022257 | A | * | 3/2010 | A01M 29/34 |
| KR | 20150031360 | A | * | 3/2015 | A01M 29/12 |
| KR | 20150004146 | U | * | 11/2015 | A44C 5/14 |
| KR | 20160000330 | U | * | 1/2016 | A01M 29/00 |
| KR | 20160001354 | U | * | 4/2016 | A01M 29/12 |
| KR | 101674926 | B1 | * | 11/2016 | A01M 29/12 |
| KR | 20170002631 | U | * | 7/2017 | G04F 1/005 |
| KR | 200487431 | Y1 | * | 9/2018 | F04D 25/0673 |
| KR | 102022663 | B1 | * | 11/2019 | A44C 5/003 |
| KR | 200490387 | Y1 | * | 11/2019 | H03G 7/002 |
| KR | 20200124026 | A | * | 11/2020 | F04D 29/002 |
| KR | 102526741 | B1 | * | 4/2023 | A01M 29/16 |
| KR | 20230066522 | A | * | 5/2023 | A01M 29/16 |
| KR | 20240178954 | A | * | 12/2024 | H01S 3/02 |
| WO | WO-2015008083 | A1 | * | 1/2015 | A01M 1/2055 |

* cited by examiner

DETACHABLE OUTDOOR MOSQUITO REPELLENT DEVICE

CROSS-REFERENCE TO RELATED APPLICATIONS

The present application claims priority to Chinese Patent Application No. 202510189517.8, filed on Feb. 20, 2025, the content of all of which is incorporated herein by reference.

FIELD

The present application relates to the technical field of mosquito repellents, in particular to a detachable outdoor mosquito repellent device.

BACKGROUND

In order to repel mosquitoes, current practices commonly use various types of mosquito repellent products such as mosquito repellent sprays, mosquito killer lamps, and mosquito repellent devices to achieve mosquito deterrence.

Existing mosquito repellents are typically designed for home use, relying on direct electrical outlet connections for power supply. This configuration restricts the application to indoor where socket-based power sources are available, resulting in limited portability. While some existing mosquito repellent products are designed to be powered by external portable power banks, however, when using in outdoor scenarios such as camping and concert venues, the mosquito repellent products necessitate separate transportation of charging accessories, introducing inconvenience. Furthermore, poor compatibility between power banks and repellent units leads to inconvenient operation and potentially reduces the product's operational lifespan.

Therefore, existing mosquito repellent products suffer from incompatible charging solutions and cumbersome portability.

SUMMARY

In view of the above-mentioned deficiencies in the prior art, an object of the present application is to provide a detachable outdoor mosquito repellent device, aiming to solve the problems existing in current mosquito repellent products, which suffer from incompatible charging solutions and cumbersome portability.

The present application provides a detachable outdoor mosquito repellent device, the following technical solution is provided: a detachable outdoor mosquito repellent device, including:

a mosquito repellent main body provided with a mosquito repellent tail portion, the mosquito repellent tail portion is provided with a power input port and a locking clasp;

a power supply unit provided with a power supply head portion, the power supply head portion is provided with a locking opening and a power output port; the locking clasp is detachably engaged with the locking opening, and the power input port is configured to engage with the power output port; when the locking clasp engages with the locking opening, the power output port is connected to the power input port, and the power supply unit supplies power to the mosquito repellent main body through the power output port.

Optionally, the mosquito repellent tail portion is provided with a shielding member and an abutment spring, the shielding member extends along an interior of the mosquito repellent main body to define a retention groove; the locking clasp is provided with a clasp body, one end of the clasp body is provided with an abutment protrusion aligned with the abutment spring, and an other end of the clasp body abuts against an inner wall of the mosquito repellent main body;

one end of the abutment spring is sleeved over and fixed to the abutment protrusion, and an other end of the abutment spring abuts against the retention groove.

Optionally, a pressing member extends from the clasp body in a direction away from the mosquito repellent main body, and by depressing the pressing member, the abutment spring is driven to compress along with the abutment protrusion.

Optionally, the clasp body is provided with a clasp protrusion, and the shielding member is provided with an opening corresponding to the clasp protrusion; the clasp protrusion extends out from the interior of the mosquito repellent main body through the opening, and the clasp protrusion is configured to detachably engage with the locking opening.

Optionally, the power supply head portion is provided with a retention protrusion aligned with the retention groove, the power output port is disposed on the retention protrusion, and the power input port is disposed on the retention groove; when the locking clasp engages with the locking opening, the retention protrusion is inserted into the retention groove, and the power output port is inserted into the power input port.

Optionally, the mosquito repellent main body is provided with a slot and a vent, and the slot is configured to receive a mosquito repellent sheet, and the vent is configured to disperse mosquito repellent gas, the slot is in fluid communication with the vent.

Optionally, the mosquito repellent main body internally is provided with a heating plate and a control module, the heating plate is electrically connected to the control module, and the heating plate is located below the vent; the slot is located between the vent and the heating plate.

Optionally, the mosquito repellent main body internally is provided with an ultrasonic module, the ultrasonic module is electrically connected to the control module, and an ultrasonic opening aligned with the ultrasonic module is disposed on a sidewall of the mosquito repellent main body.

Optionally, the mosquito repellent main body is provided with a display screen, the display screen is electrically connected to the control module and is located above the control module.

Optionally, the mosquito repellent main body is provided with a control button, the control button is electrically connected to the control module and is located on one side of the display screen; actuation of the control button triggers the control module to adjust on/off state of the ultrasonic module.

Compared with the prior art, the present application provides a detachable outdoor mosquito repellent device, including a mosquito repellent main body and a power supply unit. Through the engagement between the locking clasp of the mosquito repellent tail portion and the locking opening of the power supply head portion, the power output port and the power input port are connected. The power supply unit supplies power to the mosquito repellent main body without requiring an external socket. Furthermore, a power supply main body and the mosquito repellent main body exhibit a high consistency, and the power supply main body is a detachable power supply device, which is convenient to carry and use.

DETAILED DESCRIPTION OF EMBODIMENTS

Figure 1:
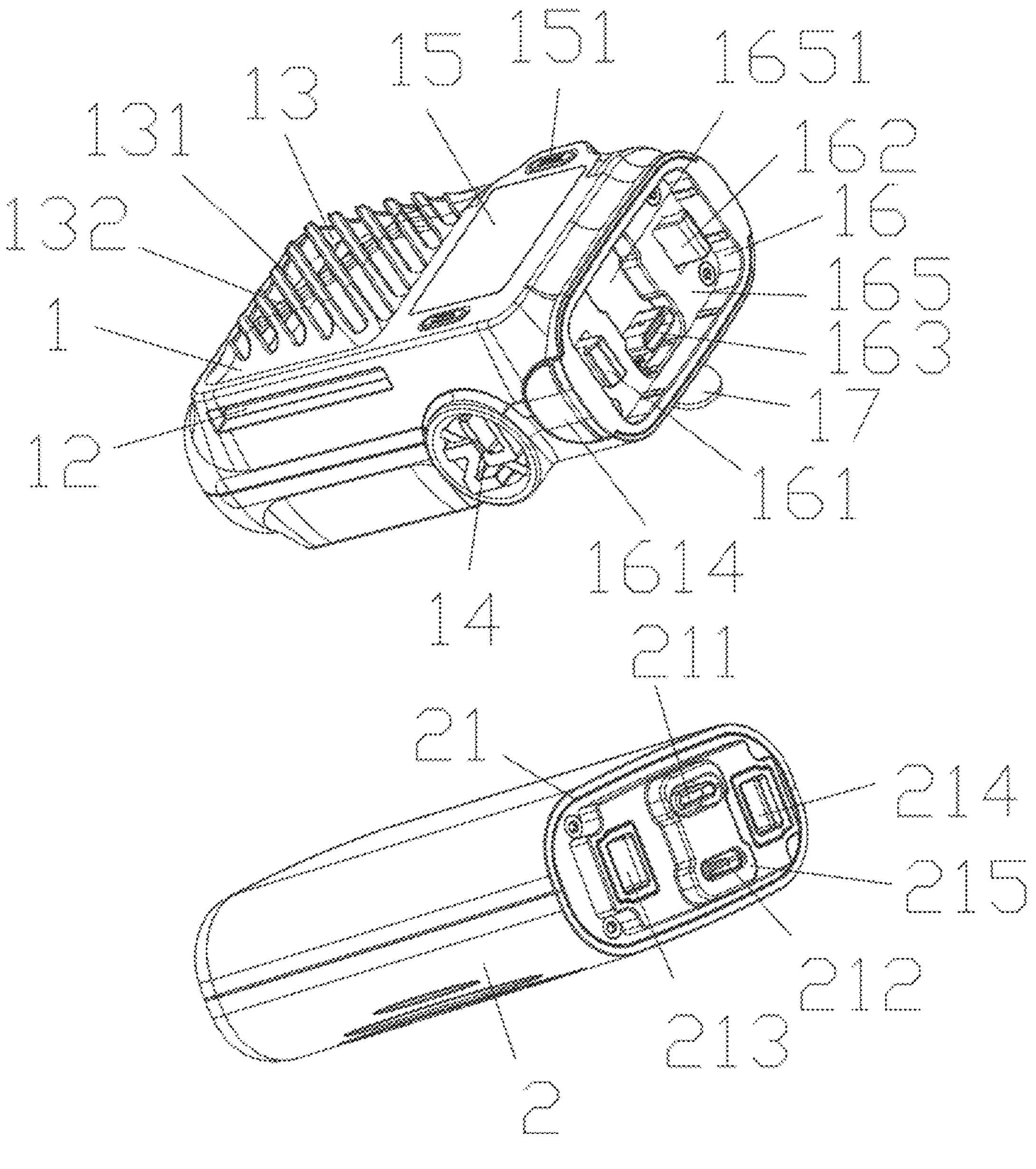
FIG. 1 is an exploded schematic view of a mosquito repellent main body and power supply unit of a detachable outdoor mosquito repellent device according to the present application.

The embodiments of the present application are described in detail herein. Examples of the embodiments are illustrated in the accompanying drawings. Throughout the specification, identical or similar reference numerals denote identical or similar components, or components having identical or similar functions. The embodiments described with reference to the drawings are exemplary and are used solely to explain the present application, and should not be interpreted as limiting the present application.

In the description of the present application, it is to be understood that orientation or positional relationships indicated by terms such as “center”, “longitudinal”, “transverse”, “upper”, “lower”, “front”, “rear”, “left”, “right”, “vertical”, “horizontal”, “top”, “bottom”, “inner”, “outer” and the like are based on orientations or positional relationships illustrated in the accompanying drawings. These terms are used solely to facilitate the description of the application and simplify the explanation, and do not imply or require that the described apparatus or components must adopt specific orientations or operate in specific configurations, therefore, such terms should not be construed as limiting the application. Furthermore, terms such as “first” and “second” are used for descriptive purposes only and should not be interpreted as indicating relative importance, implicitly specifying the number of technical features, or implying any prioritization. Features defined with “first” or “second” can explicitly or implicitly include one or more such features. In the description of the application, unless expressly stated otherwise, the term “plurality” refers to two or more.

In the description of the present application, it should be noted that terms such as “dispose”, “connect”, and “engage” are to be interpreted broadly unless expressly defined or limited otherwise. For example, connections can be fixed, detachable, or integral; they can be direct or indirect through an intermediary medium. A person skilled in the art can ascertain the specific meanings of the aforementioned terms in the context of the present application based on practical implementation.

Figure 2:
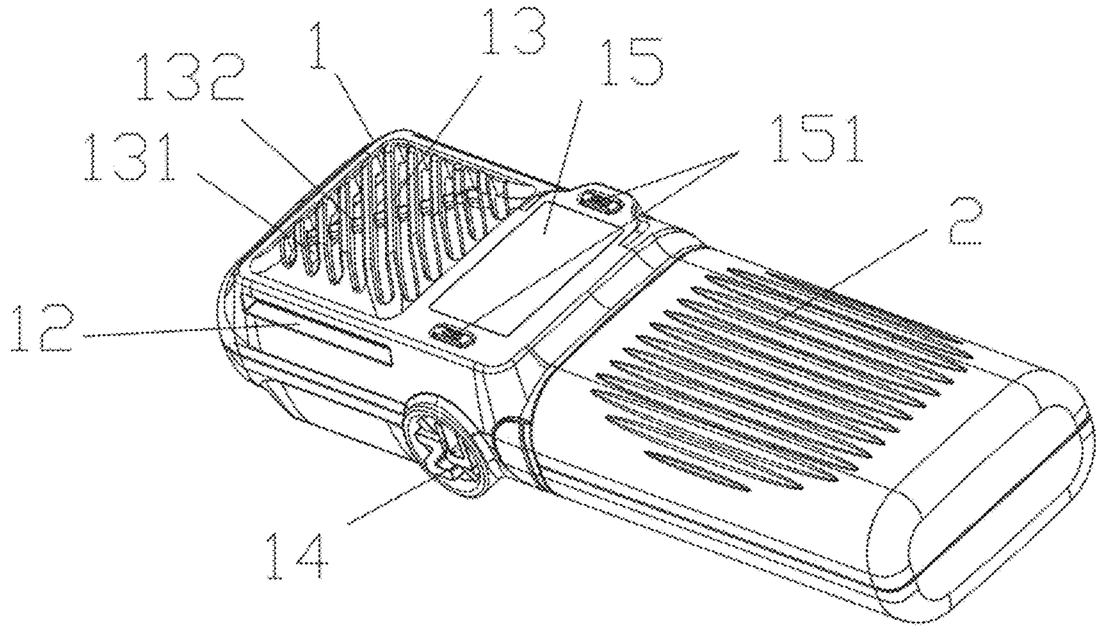
FIG. 2 is an assembled schematic view of the detachable outdoor mosquito repellent device according to the present application.
Figure 3:
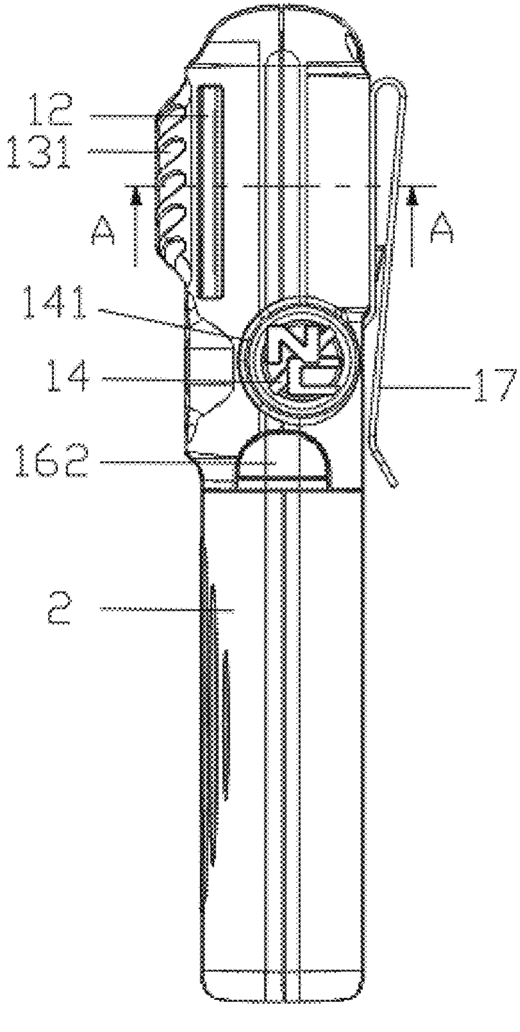
FIG. 3 is a side view of the detachable outdoor mosquito repellent device according to the present application.

With reference to FIGS. 1-3, in the first embodiment of the present application, a detachable outdoor mosquito repellent device is provided, including a mosquito repellent main body 1 and a power supply unit 2. The mosquito repellent main body 1 includes a mosquito repellent tail portion 16, the mosquito repellent tail portion 16 is provided with a power input port 163 and a locking clasp. The power supply unit 2 includes a power supply head portion 21, the power supply head portion 21 is provided with a locking opening and a power output port 211. The locking clasp is detachably engaged with the locking opening, and the power input port 163 is configured to engage with the power output port 211. When the locking clasp engages with the locking opening, the power output port 211 is electrically connected to the power input port 163, and the power supply unit 2 supplies power to the mosquito repellent main body 1 through the power output port 211.

The power input port 163 correspondingly engages with the power output port 211, while the locking clasp engages detachably with the locking opening. When the locking clasp engages with the locking opening to establish a connection, the power input port 163 and the power output port 211 are securely connected. This allows the power supply unit 2 to supply power to the mosquito repellent main body 1 through the power output port 211 and power input port 163, enabling portable operation of the mosquito repellent main body 1. A single mosquito repellent main body 1 is configured to interface with a plurality of power supply units 2. When a currently used power supply unit 2 is depleted, another power supply unit 2 can be substituted to continue supplying power to the mosquito repellent main body 1. During non-use, the locking clasp can be disengaged from the locking opening, and the power input port 163 can be separated from the power output port 211, allowing the components to be stored separately for ease of transportation.

The detachable outdoor mosquito repellent device in the present embodiment includes the mosquito repellent main body 1 and the power supply unit 2. By engaging the locking clasp on the repellent tail portion 16 with the locking opening on the power supply head 21, the power output port 211 and power input port 163 are connected. The power supply unit 2 supplies power to the mosquito repellent main body 1 without requiring an external power socket. Additionally, a power supply main body maintains high consistency with the mosquito repellent main body 1 as a detachable power supply device, ensuring portability and ease of use.

Figure 5:
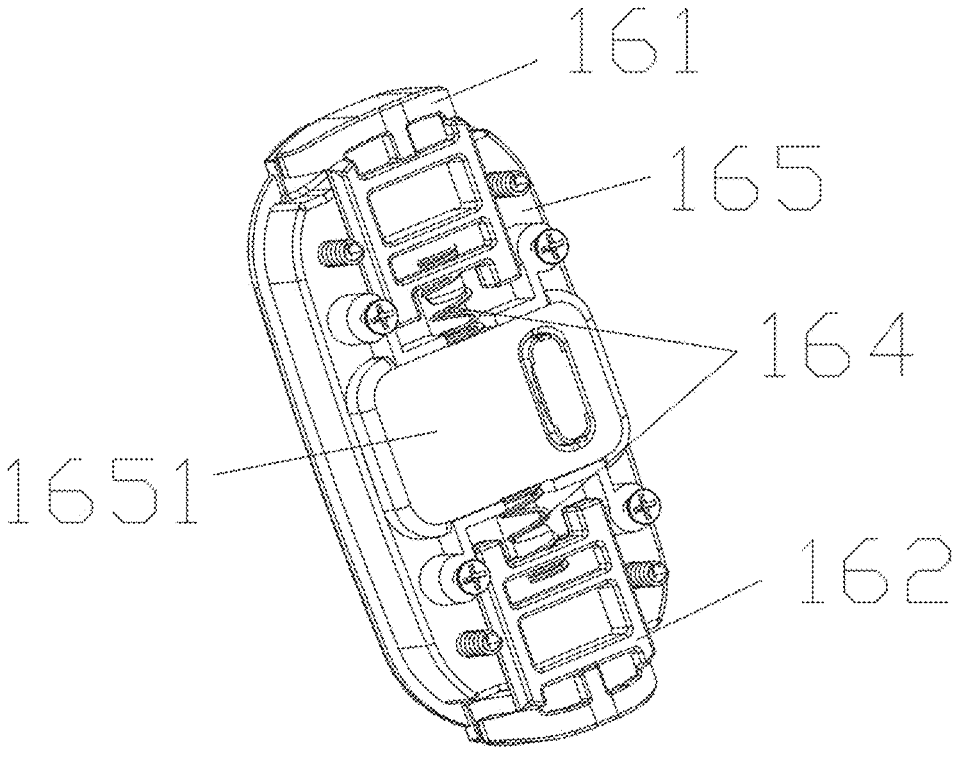
FIG. 5 is a schematic view of a locking clasp in the detachable outdoor mosquito repellent device according to the present application.
Figure 6:
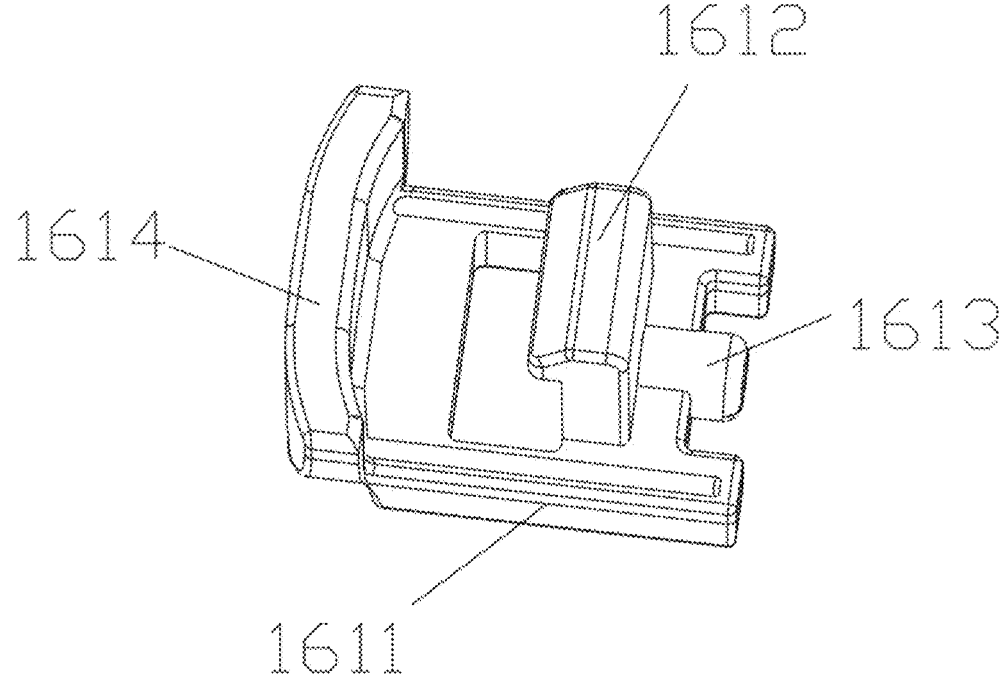
FIG. 6 is a schematic view of a shielding member in the detachable outdoor mosquito repellent device according to the present application.

In some embodiments, referring to FIGS. 5 and 6, the mosquito repellent tail portion 16 is provided with a shielding member 165 and an abutment spring 164. The shielding member 165 extends along the interior of the mosquito repellent main body 1 to define a retention groove 1651. The locking clasp is provided with a clasp body 1611, one end of the clasp body 1611 is provided with an abutment protrusion 1613 aligned with the abutment spring 164, and an other end of the clasp body 1611 abuts against an inner wall of the mosquito repellent main body 1. One end of the abutment spring 164 is sleeved over and fixed to the abutment protrusion 1613, while an other end of the abutment spring 164 abuts against the retention groove 1651.

One end of the clasp body 1611 abuts against and fits snugly with the retention groove 1651 through the abutment protrusion 1613 and the abutment spring 164, while an other end of the clasp body 1611 abuts against and conforms snugly to the inner wall of the mosquito repellent main body 1. Due to elastic force of the abutment spring 164 ensures that the clasp body 1611 remains snugly fitted to the retention groove 1651 and the mosquito repellent main body 1, thereby restricting the position of the clasp body 1611 within the mosquito repellent main body 1.

Furthermore, the clasp body 1611 is provided with a pressing member 1614 that extends away from the mosquito repellent main body 1, and pressing the pressing member 1614 drives the abutment spring 164 to compress along with the abutment protrusion 1613. When a pressing force on the pressing member 1614 is released, the compressed abutment spring 164 returns to original position through elastic restoring force, pushing the abutment protrusion 1613 outward, thereby restoring the abutment protrusion 1613 and the clasp body 1611 to original positions.

Furthermore, the clasp body 1611 is provided with a clasp protrusion 1612, and the shielding member 165 is provided with an opening corresponding to the clasp protrusion 1612. The clasp protrusion 1612 extends out from the interior of the mosquito repellent main body 1 through the opening, and the clasp protrusion 1612 is configured to engage with the locking opening through a snap-fit connection. When the clasp protrusion 1612 is engaged with the locking opening, the clasp body 1611 drives the shielding member 165 on the repellent tail portion 16 to stably connect with the power supply head portion 21, thereby achieving a secure connection between the mosquito repellent main body 1 and the power supply unit 2.

In some embodiments, the power supply head portion 21 is provided with a retention protrusion 215 aligned with the retention groove 1651, and the power output port 211 is disposed on the retention protrusion 215, and the power input port 163 is disposed on the retention groove 1651. When the locking clasp engages with the locking opening, the retention protrusion 215 is inserted into the retention groove 1651, and the power output port 211 is inserted into the power input port 163.

The arrangement of the retention groove 1651 and the retention protrusion 215 positions the power input port 163 and the power output port 211, enabling alignment for reliable engagement and improving the stability of the connection during connecting.

Furthermore, the power supply head portion 21 is provided with a charging port 212 at the retention protrusion 215. The charging port 212 is configured to connect to an external power source, enabling the power supply unit 2 to be recharged through the external power source. When the power supply unit 2 is depleted, it can be recharged through the external power source, enabling reuse of the power supply unit 2 as a power supply device and the power supply unit 2 is connected to the mosquito repellent main body 1 to supply power. The power supply unit 2 includes a rechargeable battery internally, which is connected to both the charging port 212 and the power output port 211.

Furthermore, a plurality of locking clasps are provided, such as two in number, a first locking clasp 161 and a second locking clasp 162. The first locking clasp 161 and the second locking clasp 162 are respectively disposed at both ends of the repellent tail portion 16, abutting against both sides of the shielding member 165. The first locking clasp 161 is located on the left side of the repellent tail portion 16, and the second locking clasp 162 is located on the right side of the repellent tail portion 16. Each locking clasp connects to the retention groove 1651 through the abutment spring 164 from respective left and right sides.

The number of abutment springs 164 corresponds to the number of locking clasps, that is, the abutment springs 164 are sleeved over and fixed to the abutment protrusion 1613 of the first locking clasp 161 and the abutment protrusion 1613 of the second locking clasp 162. The retention groove 1651 is positioned at a central area of the shielding member 165.

Furthermore, the number of locking openings on the power supply unit 2 corresponds to the number of locking clasps. Increasing the number of the locking clasps and locking openings enhances stability of the connection between the power supply unit 2 and the mosquito repellent main body 1, preventing the power supply unit 2 from detaching and resulting in the mosquito repellent main body 1 being unable to operate normally. The power supply unit 2 is provided with a first locking opening 213 aligned with the first locking clasp 161, and a second locking opening 214 aligned with the second locking clasp 162.

Figure 4:
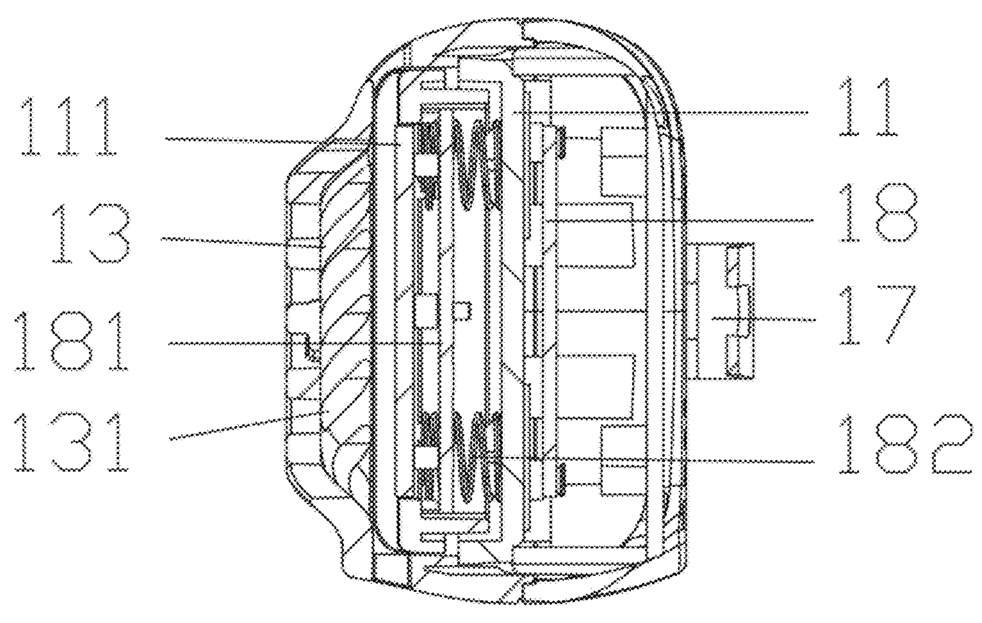
FIG. 4 is a cross-sectional view taken along line A-A of the FIG. 3.

With reference to FIG. 4, in some embodiments, the mosquito repellent main body 1 is provided with a slot 12 and a vent 131. The slot 12 is configured to receive a mosquito repellent sheet, while the vent 131 is configured to disperse repellent gas. The slot 12 is in fluid communication with the vent 131. During use, the mosquito repellent sheet is inserted through the slot 12, and the repellent gas emit through the sheet flows from the slot 12 to the vent 131, and is dispersed to repel mosquitoes.

The mosquito repellent main body 1 is provided with a mosquito repellent section 13. The slot 12 is disposed on a side surface of the mosquito repellent section 13, and the vent 131 is disposed on a surface of the mosquito repellent section 13, with the vent 131 in fluid communication with the slot 12, gas can flow into the slot 12 and then exit through the vent 131. In one embodiment, a plurality of vents 131 are provided and disposed at a tilted angle on the mosquito repellent section 13. With tilted configuration, the plurality of vents 131 at the central area of the mosquito repellent section 13 possess a larger area, while the area gradually decreases along the direction away from the center, facilitating mosquito repellent gas to be dispersed through the central area.

A heating plate 111 features a higher density of heating wires at a central area to achieve better heating efficiency. The mosquito repellent gas that emits through the central area and exits through the vent 131 interacts more thoroughly with the mosquito repellent sheet, resulting in a higher gas concentration and improved repellent efficacy. Simultaneously, the higher wire density at the center area reduces amount of the mosquito repellent gas dispersed from peripheral edges of the mosquito repellent section 13, thereby lowering edge temperature of the mosquito repellent section 13 and preventing users from being scalded or burned by the edges of the mosquito repellent section 13.

Furthermore, the mosquito repellent section 13 is provided with a partition plate 132 angled relative to the vent 131. The partition plate 132 partially redirect the mosquito repellent gas flow before exiting, thereby expanding diffusion range of the mosquito repellent gas and preventing thermal concentration-induced damage to the vent 131 at the central area. An angle between the partition plate 132 and the vent 131 is between 50 and 90 degrees. In one embodiment, a plurality of partition plates 132 can be provided, with the arrangement of the partition plates altering the distribution of the vent 131 openings, ensuring uniform dispersion of the repellent vapor that has fully interacted with the mosquito repellent sheet. This configuration broadens the mosquito repellent gas dispersion area and enhances overall repellent efficacy.

Furthermore, the mosquito repellent main body 1 internally is provided with the heating plate 111 and a control module 18. The heating plate 111 is electrically connected to the control module 18, and the heating plate 111 is located below the vent 131; and the slot 12 is located between the vent 131 and the heating plate 111.

When the mosquito repellent sheet is inserted into the slot 12, the mosquito repellent sheet is located between the vent 131 and the heating plate 111 to be heated by the heating plate 111. The slot 12, the heating plate 111, and the vent 131 are interconnected in fluid communication. Ambient air enters through the slot 12, emits through a heating process between the heating plate 111 and the mosquito repellent sheet, thereby carrying volatilized mosquito vapor to form the mosquito repellent gas, which is subsequently dispersed through the vent 131 to achieve mosquito repellent effects.

Furthermore, a power supply section 11 is disposed between a control module group and the heating plate 111. The power supply section 11 is electrically connected to the control module group to supply power to the control module group. A connection spring 182 is disposed between the power supply section 11 and the heating plate 111. One end of the connection spring 182 abuts against the heating plate 111, while an other end of the connection spring 182 abuts against the power supply section 11, thereby maintaining spatial separation between the heating plate 111 and the power supply section 11, preventing thermal damage to the power supply section 11 caused by heat generated from the heating plate 111, while concurrently mitigating temperature-induced operational interference with the control module group to prevent functional impairment of the control module group.

Furthermore, an insulation plate 181 is provided between the power supply section 11 and the heating plate 111. The insulation plate 181 is provided with through-holes allowing passage of the connection spring 182, enabling the insulation plate 181 to partially isolate heat from the heating plate 111, thereby preventing thermal damage to the power supply section 11 caused by heating of the heating plate 111. In one embodiment, a plurality of connection springs 182 are provided, such as four in number, respectively located at four corners of the heating plate 111 to lift the heating plate 111 up, preventing direct contact between the heating plate 111 and the power supply section 11.

In some embodiments, the mosquito repellent main body 1 internally is provided with an ultrasonic module 14, the ultrasonic module 14 is electrically connected to the control module 18. An ultrasonic opening 141 corresponding to the ultrasonic module 14 is provided on a sidewall of the mosquito repellent main body 1.

An emission port of the ultrasonic module 14 is aligned with the ultrasonic opening 141, allowing ultrasonic waves to transmit through the ultrasonic opening 141 to achieve mosquito repellent effects. The emission port of the ultrasonic module 14 is exposed through the ultrasonic opening 141, thereby enabling transmission of emitted ultrasonic waves through the ultrasonic opening 141.

In one embodiment, a plurality of ultrasonic modules 14 are provided, such as two in number, respectively disposed on both sides of the mosquito repellent main body 1 to achieve expanded ultrasonic wave propagation coverage. A barrier member is provided between the shielding member 165 and the ultrasonic modules 14, configured to separate the ultrasonic modules 14 from the shielding member 165, thereby preventing operational interference with the ultrasonic modules 14 during detachment or connection processes between the mosquito repellent main body 1 and the power supply unit 2.

In some embodiments, a display screen 15 is provided on the mosquito repellent main body 1, the display screen 15 is electrically connected to the control module 18 and is located above the control module 18. The display screen 15 is disposed on an exterior surface of the mosquito repellent main body 1, configured to visually indicate operational status parameters of the mosquito repellent main body 1 through the display screen 15, including but not limited to state of charge, temperature of the heating plate 111, and ultrasonic operational power.

Figure 7:
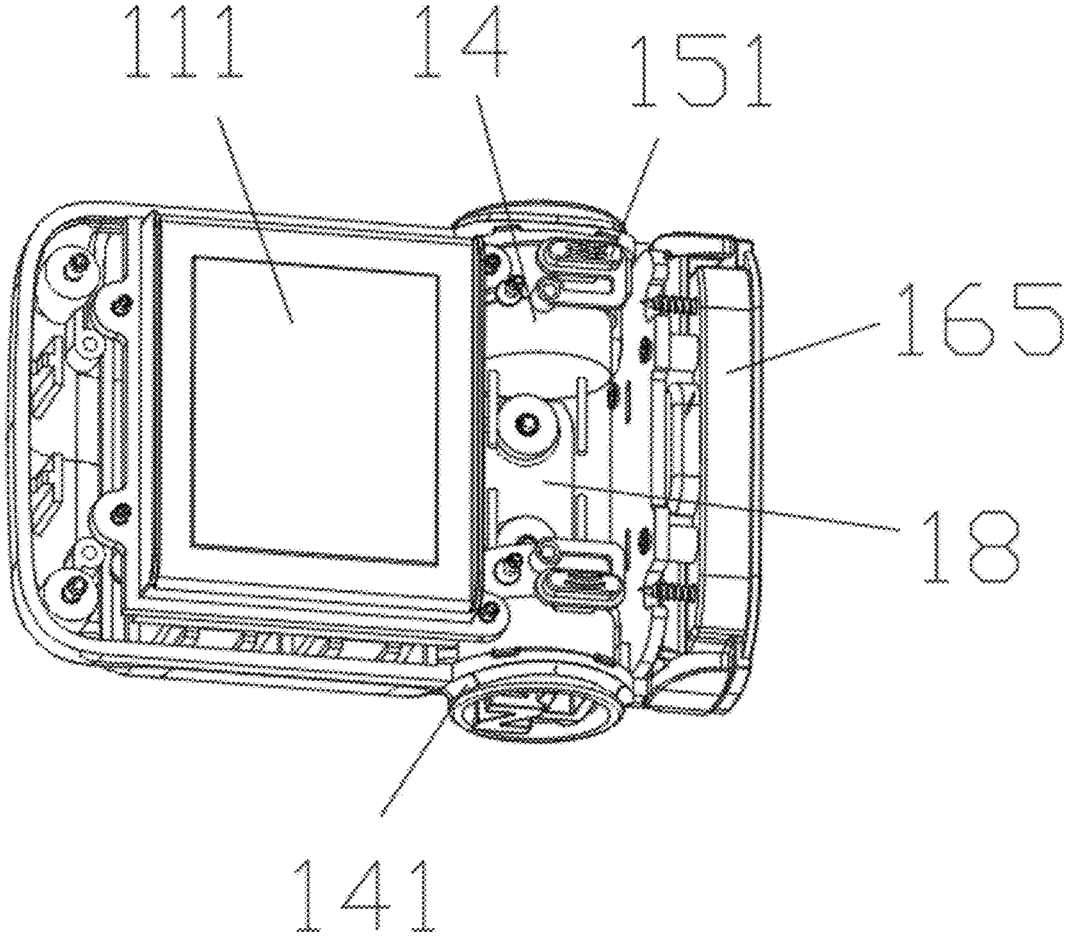
FIG. 7 is a schematic view of the mosquito repellent main body with an upper housing being removed in the detachable outdoor mosquito repellent device according to the present application.

With reference to FIG. 7, a housing of the mosquito repellent main body 1 isolates the mosquito repellent section 13 from the ultrasonic module 14 and the display screen 15, preventing temperature increase during heating operation of the heating plate 111 from affecting operation of the ultrasonic module 14 and the display screen 15. The housing of the mosquito repellent main body 1 is constructed using electrically and thermally insulating materials, preventing heat from the heating plate 111 from being conducted to the housing, thereby avoiding excessive heating of the mosquito repellent main body 1 and improving user comfort during operation.

Furthermore, a control button 151 is further provided on the mosquito repellent main body 1, the control button 151 is electrically connected to the control module 18 and is located on one side of the display screen 15. Actuation of the control button 151 triggers the control module 18 to adjust on/off state of the ultrasonic module 14. Moreover, the mosquito repellent main body 1 is provided within a power supply section 11, and the power supply section 11 is connected to the control module 18. Depressing the control button 151 actuates the control module 18 to switch the power supply section 11 between on/off states.

The control button 151 is electrically connected to the control module 18. By pressing the control button 151, the control module 18 is triggered to adjust. The control module 18 adjusts: activation state of the heating plate 111; temperature of the heating plate 111; operational status of the ultrasonic module 14; and power of the ultrasonic module 14.

In one embodiment, a plurality of control buttons 151 are provided, with different control buttons 151 configured to adjust different parameters of the control module 18. The control buttons 151 can be two in number, and provided on both sides of the display screen 15 and configured to separately adjust different parameters of the control module 18. For example, a prolonged press on a left control button 151 activates heating functionality of the heating plate 111, a prolonged press on a right control button 151 deactivates heating functionality of the heating plate 111, two consecutive short presses on the left control button 151 activate the ultrasonic module 14, and two consecutive short presses on the right control button 151 deactivate the ultrasonic module 14.

The power supply section 11 can be configured as a built-in battery for supplying power to the control module 18, on/off states of the power supply section 11 are controlled by pressing the control button 151.

The housing of the mosquito repellent main body 1 can include an upper housing and a lower housing, the mosquito repellent section 13, the display screen 15, and the control button 151 are all provided on the upper housing, the upper housing is detachably engaged with the lower housing through fastening members including but not limited to screws and bolts, defining a hollow chamber that is configured to accommodate the control module 18 and ultrasonic module 14.

A clamping member 17 can be provided at an end of the mosquito repellent main body 1 away from the mosquito repellent section 13. The clamping member 17 enables secure attachment and fixation of the mosquito repellent main body 1, facilitating user portability and operational convenience; the clamping member 17 is located on an exterior surface of the lower housing.

In summary, the present application provides a detachable outdoor mosquito repellent device, including a mosquito repellent main body and a power supply unit. Through the engagement between the locking clasp of the mosquito repellent tail portion and the locking opening of the power supply head portion, the power output port and the power input port are connected. The power supply unit supplies power to the mosquito repellent main body without requiring an external socket. Furthermore, a power supply main body and the mosquito repellent main body exhibit a high consistency, and the power supply unit is a detachable power supply device, which is convenient to carry and use.

It is finally to be noted that the aforementioned embodiments are merely illustrative for explaining the technical solutions of the present application, and are not to be construed as limitations thereto. Although the present application has been described in detail with reference to the aforementioned embodiments, those skilled in the art shall understand that modifications may still be made to the technical solutions recited in the embodiments, or equivalent substitutions may be applied to partial technical features. Such modifications or substitutions shall not render the essence of the corresponding technical solutions to depart from the spirit and scope of the technical solutions set forth in the embodiments of the present application.

What is claimed is:

1. A detachable outdoor mosquito repellent device, comprising:

a mosquito repellent main body comprising a mosquito repellent tail portion, and a power input port and a locking clasp are disposed on the mosquito repellent tail portion; and a power supply unit comprising a power supply head portion, a locking opening and a power output port are disposed on the power supply head portion; the locking clasp is detachably engaged with the locking opening, and the power input port is configured to engage with the power output port; and when the locking clasp engages with the locking opening, the power output port is connected to the power input port, and the power supply unit supplies power to the mosquito repellent main body through the power output port: wherein a shielding member and an abutment spring are disposed on the mosquito repellent tail portion, the shielding member extends along an interior of the mosquito repellent main body to define a retention groove: the locking clasp comprises a clasp body, an abutment protrusion aligned with the abutment spring is disposed on one end of the clasp body, and another end of the clasp body abuts against an inner wall of the mosquito repellent main body; and one end of the abutment spring is sleeved over and fixed to the abutment protrusion, and an other end of the abutment spring abuts against the retention groove; and wherein a clasp protrusion is disposed on the clasp body, and an opening corresponding to the clasp protrusion is disposed on the shielding member; and the clasp protrusion extends out from the interior of the mosquito repellent main body through the opening, and the clasp protrusion is configured to detachably engage with the locking opening.

2. The detachable outdoor mosquito repellent device according to claim 1, wherein a pressing member extends from the clasp body in a direction away from the mosquito repellent main body, and by depressing the pressing member, the abutment spring is driven to compress along with the abutment protrusion.

3. The detachable outdoor mosquito repellent device according to claim 1, wherein a retention protrusion aligned with the retention groove is disposed on the power supply head portion, the power output port is disposed on the retention protrusion, and the power input port is disposed on the retention groove; and, when the locking clasp engages with the locking opening, the retention protrusion is inserted into the retention groove, and the power output port is inserted into the power input port.

4. The detachable outdoor mosquito repellent device according to claim 1, wherein a slot and a vent are disposed on the mosquito repellent main body, and the slot is configured to receive a mosquito repellent sheet, and the vent is configured to disperse mosquito repellent gas, the slot is in fluid communication with the vent.

5. The detachable outdoor mosquito repellent device according to claim 4, wherein a heating plate and a control module are disposed in the mosquito repellent main body, the heating plate is electrically connected to the control module, and the heating plate is located below the vent; and the slot is located between the vent and the heating plate.

6. The detachable outdoor mosquito repellent device according to claim 5, wherein an ultrasonic module is disposed in the mosquito repellent main body, the ultrasonic module is electrically connected to the control module, and an ultrasonic opening aligned with the ultrasonic module is disposed on a sidewall of the mosquito repellent main body.

7. The detachable outdoor mosquito repellent device according to claim 6, wherein a display screen is disposed on the mosquito repellent main body, and the display screen is electrically connected to the control module and is located above the control module.

8. The detachable outdoor mosquito repellent device according to claim 6, wherein a control button is disposed on the mosquito repellent main body, the control button is electrically connected to the control module and is located on one side of the display screen; and actuation of the control button triggers the control module to adjust on/off state of the ultrasonic module.

* * * * *